US012683481B2

(12) United States Patent
Chen

(10) Patent No.: US 12,683,481 B2
(45) Date of Patent: Jul. 14, 2026

(54) ZERO VOLTAGE SWITCHING HYBRID CONVERTER

(71) Applicant: Alpha and Omega Semiconductor International LP, Toronto (CA)

(72) Inventor: Cheng-Wei Chen, Cupertino, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 205 days.

(21) Appl. No.: 18/644,096

(22) Filed: Apr. 24, 2024

(65) Prior Publication Data

US 2025/0337314 A1 Oct. 30, 2025

(51) Int. Cl.
*H02M 1/00* (2006.01)

(52) U.S. Cl.
CPC ....... *H02M 1/0095* (2021.05); *H02M 1/0058* (2021.05)

(58) Field of Classification Search
CPC .......................... H02M 1/0095; H02M 1/0058
See application file for complete search history.

(56) References Cited

U.S. PATENT DOCUMENTS

| 7,230,405 | B2 | 6/2007 | Jang et al. |
| 10,804,798 | B1 | 10/2020 | Rizzolatti et al. |
| 10,958,166 | B1 | 3/2021 | Low et al. |

| 2021/0184586 | A1 | 6/2021 | Jin et al. | |
| 2023/0261571 | A1 | 8/2023 | Ursino et al. | |
| 2023/0353058 | A1 * | 11/2023 | Rizzolatti | H02M 3/155 |

FOREIGN PATENT DOCUMENTS

| EP | 3981064 | B1 | 3/2024 | |
| TW | 202329595 | A | 7/2023 | |
| WO | 2020245699 | A1 | 12/2020 | |
| WO | 2022241035 | A1 | 11/2022 | |
| WO | WO-2025106919 | A1 * | 5/2025 | H02M 3/1586 |

OTHER PUBLICATIONS

Yungtaek Jang, M. M. Jovanovic and Y. Panov, "Multiphase buck converters with extended duty cycle," Twenty-First Annual IEEE Applied Power Electronics Conference and Exposition, 2006. APEC '06., Dallas, TX, USA, 2006, pp. 7 pp.-, doi: 10.1109/APEC.2006. 1620513.

(Continued)

*Primary Examiner* — Harry R Behm

(57) ABSTRACT

A non-isolated DC-to-DC switching hybrid converter is implemented using a cross-coupled series-capacitor quadruple step-down buck converter topology. In some embodiments, the DC-to-DC switching hybrid converter includes a switched-capacitor converter circuit and incorporates a zero-voltage switching network to implement soft switching and a coupled inductor to realize a fixed step-down ratio. The hybrid converter is capable of supporting a high step-down ratio (such as 8:1) while providing high efficiency. In other embodiments, the DC-to-DC switching hybrid converter incorporates a transformer in place of the coupled inductor to further increase the step-down ratio.

18 Claims, 5 Drawing Sheets

(56)          References Cited

OTHER PUBLICATIONS

M. Halamicek, T. McRae and A. Prodić, "Cross-Coupled Series-Capacitor Quadruple Step-Down Buck Converter," 2020 IEEE Applied Power Electronics Conference and Exposition (APEC), New Orleans, LA, USA, 2020, pp. 1-6, doi: 10.1109/APEC39645. 2020.9124412.
S. Saggini, S. Jiang, M. Ursino and C. Nan, "A 99% Efficient Dual-Phase Resonant Switched-Capacitor-Buck Converter for 48 V Data Center Bus Conversions," 2019 IEEE Applied Power Electronics Conference and Exposition (APEC), Anaheim, CA, USA, 2019, pp. 482-487, doi: 10.1109/APEC.2019.8721860.
Rais Miftakhutdinov, "Improving System Efficiency with a New Intermediate-Bus Architecture," Texas Instruments Power Supply Design Seminar, 2008, 20 pages.
R. Das and H.-P. Le, "A Regulated 48V-to-1V/100A 90.9%-Efficient Hybrid Converter for POL Applications in Data Centers and Telecommunication Systems," 2019 IEEE Applied Power Electronics Conference and Exposition (APEC), Anaheim, CA, USA, 2019, pp. 1997-2001, doi: 10.1109/APEC.2019.8722246.
Office Action cited in corresponding Taiwan Patent Application No. 114114039, Issued Mar. 25, 2026, 8 pages.
Office Action cited in corresponding Taiwan Patent Application No. 114114039, Issued Oct. 9, 2025, 7 pages.

\* cited by examiner

ZERO VOLTAGE SWITCHING HYBRID CONVERTER

FIELD OF THE INVENTION

The invention relates to DC-DC converters and, in particular, to a DC-DC hybrid converter with a fixed step-down ratio.

BACKGROUND OF THE INVENTION

Power distribution systems for telecommunication systems and data network systems have shifted from a centralized power supply to a distributed power architecture. In a distributed power architecture, an AC/DC front-end power supply generates a 48V backplane voltage which is distributed to each shelf or line card of the system to be stepped down to the low-level supply voltages using distributed DC/DC converters at each shelf or line card. More recently, the Intermediate Bus Architecture (IBA) has been developed for server and data communication applications where the low-level supply voltages can be in the range of 0.5V to 3.3V. In an IBA power system, a front-end AC/DC power supply provides a 48V backplane voltage which is provided to an Intermediate Bus Converter (IBC). The IBC converts the 48V backplane voltage to an intermediate bus voltage, typically 5-14V. The intermediate bus voltage is then supplied to point-of-load regulators to provide high-quality voltages at lower supply voltage values (e.g. 0.5-3.3V).

With increasing power demands from increasingly powerful processors in servers or data centers, the IBC has to meet even higher efficiency and power density demands. Achieving high efficiency is important in cases when the IBA power system is implemented with a high step-down ratio.

SUMMARY OF THE INVENTION

The present disclosure discloses a DC-DC switching hybrid converter, substantially as shown in and/or described below, for example in connection with at least one of the figures, as set forth more completely in the claims.

In one embodiment, a DC-DC switching hybrid converter receiving an input voltage and generating an output voltage having a substantially constant magnitude on an output node includes a switched-capacitor converter circuit including a set of switches configured to provide a fixed step-down ratio of M:1 between the input voltage and the output voltage; a first capacitor coupled between a first node and a second node, the first node being switchably coupled to the input voltage and the second node being switchably coupled to a ground potential; and second and third capacitors coupled to the set of switches in a cross-coupled configuration; first and second inductors each having a first terminal coupled to the output node, the first and second inductors being configured as coupled inductors; and a zero-voltage switching network coupled between the second node and the ground potential to discharge voltages at some of the switches between switching states of the hybrid converter. The hybrid converter generates the output voltage at the output node being 1/M of the input voltage.

In another embodiment, a DC-DC switching hybrid converter receiving an input voltage and generating an output voltage having a substantially constant magnitude on an output node includes a switched-capacitor converter circuit including a set of switches configured to provide a fixed step-down ratio of M:1 between the input voltage and the output voltage; a first capacitor coupled between a first node and a second node, the first node being switchably coupled to the input voltage and the second node being switchably coupled to a ground potential; and second and third capacitors coupled to the set of switches in a cross-coupled configuration; a transformer including a first primary winding and a second primary winding inductively coupled to a first secondary winding and a second secondary winding, center taps of the first and second primary windings being coupled to respective second and third capacitors, each primary winding and each secondary winding have a turns ratio of N1/N2; and a zero-voltage switching network coupled between the second node and the ground potential to discharge voltages at some of the switches between switching states of the hybrid converter. The hybrid converter generates the output voltage at the output node having a stepped down value from the input voltage determined by the fixed step-down ratio M:1 and the turns ratio N1/N2 of the transformer.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the figures are not necessarily to scale.

DETAILED DESCRIPTION OF THE INVENTION

According to aspects of the present invention, a non-isolated DC-to-DC switching hybrid converter is implemented using a cross-coupled series-capacitor quadruple step-down buck converter that incorporates a zero-voltage switching network to implement soft switching and a coupled inductor to realize a fixed step-down ratio. The hybrid converter is capable of supporting a high step-down ratio (such as 8:1) while providing high efficiency.

Furthermore, the hybrid converter is capable of converting electrical power in a bidirectional manner. That is, when the switching hybrid converter receives an input voltage at the input node, the converter provides a stepped down output voltage at the output node. However, when the switching hybrid converter receives an input voltage on the output node, the converter provides a stepped up output voltage at the input node.

In other embodiments, the DC-to-DC switching hybrid converter can be implemented by substituting the coupled inductor with a transformer. In this case, the turns ratio of the transformer can be used to realize an even greater step-down ratio.

In the present description, a hybrid converter refers to a converter topology that combines capacitive and inductive switching networks to reduce component stress, component volume, and switching loss while maintaining or increasing power processing efficiency.

Figure 1:
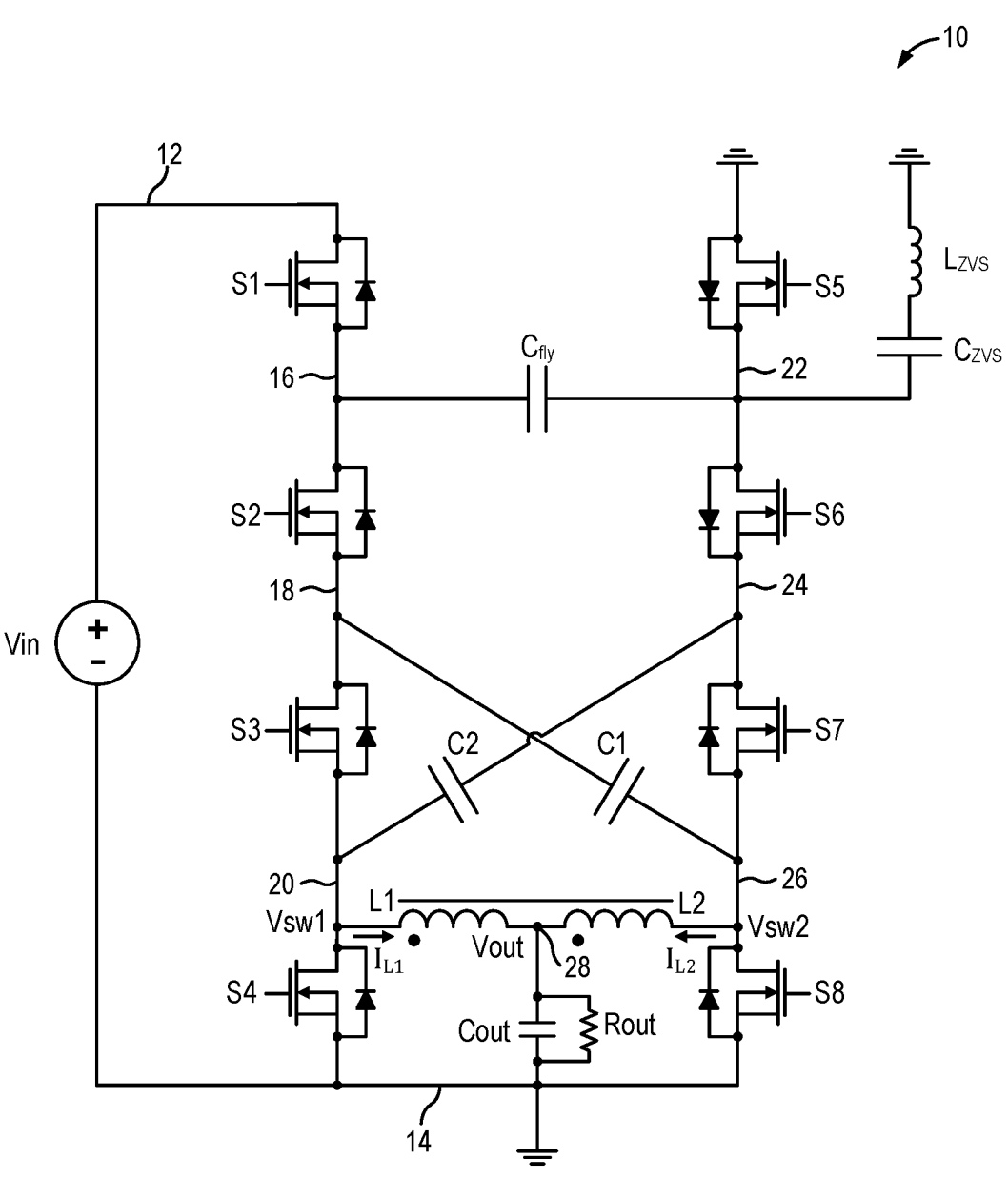
FIG. 1 is a schematic diagram of a non-isolated DC-to-DC switching hybrid converter in embodiments of the present invention.

FIG. 1 is a schematic diagram of a non-isolated DC-to-DC switching hybrid converter in embodiments of the present invention. Referring to FIG. 1, a non-isolated DC-to-DC switching hybrid converter 10 is formed by a switched-capacitor converter circuit with three flying capacitors, a coupled inductor and incorporating a zero-voltage switching network. The hybrid converter 10 receives an input voltage Vin on an input node 12 and generates an output voltage Vout on an output node 28. The hybrid converter 10 implements a fixed step-down ratio of M:1, M being an integer. In some embodiments, the fixed step-down ratio 8:1 where the input voltage is 48V and the output voltage is 6V. The hybrid converter 10 of the present disclosure is particularly suitable in applications requiring large conversion ratio while providing high conversion efficiency. In other embodiments, the hybrid converter 10 of the present disclosure can be configured to provide other fixed step-down ratio values, such as 4:1 or 6:1, as is understood by one skilled in the art.

More specifically, the switched-capacitor converter circuit includes eight switches S1 to S8. Switches S1 and S4 are connected in series between the input voltage Vin (node 12) and the ground potential (node 14). Switches S5 to S8 are connected in series between the ground potentials. That is, switches S5 to S8 are connected in series and the end terminals of switch S5 and switch S8 are both connected to the ground potential (node 14). In the present embodiment, switches S1-S8 are implemented using N-type MOSFET devices or NMOS transistors. In other embodiments, other suitable devices can be used to implement the switches.

The switched-capacitor converter circuit further includes a first flying capacitor Cfly connected between a node 16 and a node 22. The node 16 is between switches S1 and S2. Switch S1 switchably connects node 16 to the input voltage Vin. The node 22 is between switches S5 and S6. Switch S5 switchably connects node 22 to the ground potential. The switched-capacitor converter circuit further includes two other flying capacitors configured as a pair of cross-coupled capacitors C1 and C2. In particular, the capacitor C1 is connected between a node 18 and a node 26. Node 18 is between switches S2 and S3. Node 26 is between switches S7 and S8 and is also the switching voltage node Vsw2. The capacitor C2 is connected between a node 24 and a node 20. Node 24 is between switches S6 and S7. Node 20 is between switches S3 and S4 and is also the switching voltage node Vsw1.

The hybrid converter 10 includes a pair of inductors L1 and L2 configured as a coupled inductor. By way of explanation, a coupled inductor has two or more windings on a common core. In the present description, inductors L1 and L2 denote the two windings formed on a common core of a coupled inductor. The inductor L1 is connected between the node 20 and the output node 28. The inductor L2 is connected between the node 26 and the output node 28. In a coupled inductor configuration, the voltages across the inductors L1 and L2 are forced to be the same. Therefore, the mid-point or common node 28 of inductors L1 and L2 has half the voltage across the coupled inductor L1/L2.

In the present illustration, the output voltage Vout is provided to drive a load represented by a capacitor Cout and a resistor Rout connected in parallel. Capacitor Cout and resistor Rout are provided merely as a representation of a load and is not intended to illustrate actual circuit elements. The output voltage Vout is stepped down from the input voltage Vin by the fixed step-down ratio of M:1. That is, the output voltage Vout is 1/M of the input voltage Vin. For example, the input voltage Vin may be 48V and the hybrid converter has a step-down ratio of 8:1. The output voltage Vout is therefore ⅛ of the input voltage or 6V.

The hybrid converter 10 is controlled in response to a clock signal to turn the switches S1-S8 on and off. For example, the hybrid converter 10 may employ pulse width modulation (PWM) to control the duty cycle of the switches S1-S8. That is, the on-time of the switches S1-S8 may be controlled at a given fixed or variable frequency by adjusting the pulse width. In embodiments of the present invention, the hybrid converter 10 includes a PWM controller (not shown) receiving a clock signal and generating one or more control signals having the desired duty cycle for driving the switches S1-S8. For instance, the clock signal has a given clock frequency and each period of the clock signal defines a switching cycle in the hybrid converter.

In embodiments of the present invention, switches S1, S3, S6 and S8 (the first group of switches) are controlled by a first control signal to switch on and off synchronously. Meanwhile, switches S2, S4, S5, S7 (the second group of switches) are controlled by a second control signal to switch on and off synchronously. Within a switching cycle, the first control signal has a first duty cycle corresponding to a first switching state to turn on switches S1, S3, S6 and S8; and the second control signal has a second duty cycle corresponding to a second switching state to turn on switches S2, S4, S5, S7. In the present embodiment, the first duty cycle and the second duty cycle are non-overlapping. That is, the first group of switches (S1, S3, S6 and S8) and the second group of switches (S2, S4, S5, S7) are turned on and off alternately and are not turned on at the same time.

In embodiments of the present invention, in the case the switches S1 to S8 are MOSFET devices, the first and second control signals are coupled to the gate terminals of the respective MOSFET devices to turn the MOSFET devices on and off.

As a result of inductors L1 and L2 being implemented as a coupled inductor, the voltages across inductor L1 and inductor L2 during the first switching state are the same; and the voltages across inductor L1 and inductor L2 during the second switching state are the same.

During operation of the hybrid converter 10, it is often desirable to avoid "hard switching" in the switched-capacitor converter circuit in order to reduce current spiking during switch on-off transitions between the first and second duty cycles, where switches in one group are being turned off and switches in the other group are being turned on. In particular, "soft switching" is preferred where the switches are switched when there is near zero voltage across them and near zero current flowing through the switches. In embodiments of the present invention, the hybrid converter 10 includes a zero-voltage switching network to realize soft switching capability. Referring still to FIG. 1, the zero-voltage switching network in hybrid converter 10 is implemented by a capacitor $C_{ZVS}$ and an inductor $L_{ZVS}$ connected in parallel between the node 22 and the ground potential. In particular, capacitor $C_{ZVS}$ has a first terminal connected to the node 22 (between switch S5 and S6) and a second terminal connected to the inductor $L_{ZVS}$. Inductor $L_{ZVS}$ has a first terminal connected to the capacitor $C_{ZVS}$ and a second terminal connected to the ground potential.

In operation, the zero-voltage switching network provides a freewheeling current to discharge the voltages at switches S1, S2, S5 and S6 during the dead time between the active duty cycles. For instance, the zero-voltage switching network charges and discharges the drain-to-source voltages across the MOSFET devices implementing switches S1, S2, S5, S6 during the dead time or the transition time between active duty cycles. In one example, switches S1 and S6 are turned on during an active duty cycle and during the following dead time before the next active duty cycle, the ZVS network provides a current to discharge switches S2 and S5 and charge switches S1 and S6 during the dead time. Then switches S2 and S5 are turned on in the next active duty cycle with zero voltage switching across the switches. In this manner, zero voltage crossing is realized where the next duty cycle is initialized with the switches S1, S2, S5, S6 and the flying capacitor Cfly having near zero current flowing. When the hybrid converter 10 is implemented with soft switching capability, the converter can have low switching losses and achieve higher efficiency and power density.

In embodiments of the present invention, the hybrid converter 10 includes a series connection of an inductor and a capacitor forming a resonant circuit. Capacitors C1 and C2 resonant with the leakage inductance of the coupled inductor plus the parasitic inductance in the printed circuit board on which the DC-DC converter is implemented. It is instructive to note that switches S3, S4, S7 and S8 will have inherent soft switching as long as the resonant tank and the switching frequency is properly designed.

A salient feature of the hybrid converter of the present disclosure is that the converter is bi-directional. That is, the hybrid converter is capable of converting electrical power in a bidirectional manner. In the above description, the input voltage Vin is provided at the input node 12 and the output voltage Vout is obtained at the output node 28. In other applications, an input voltage can be provided at the output node 28 and an output voltage can be taken at the input node 12. In this case, the output voltage would be a stepped up voltage of the input voltage by a 1:M factor.

In the present embodiment, the capacitors C1 and C2 has the same capacitance value and the inductors L1 and L2 have the same inductance value. In other embodiments, appropriate component values can be selected for the capacitors C1, C2 and inductors L1, L2.

Figure 2:
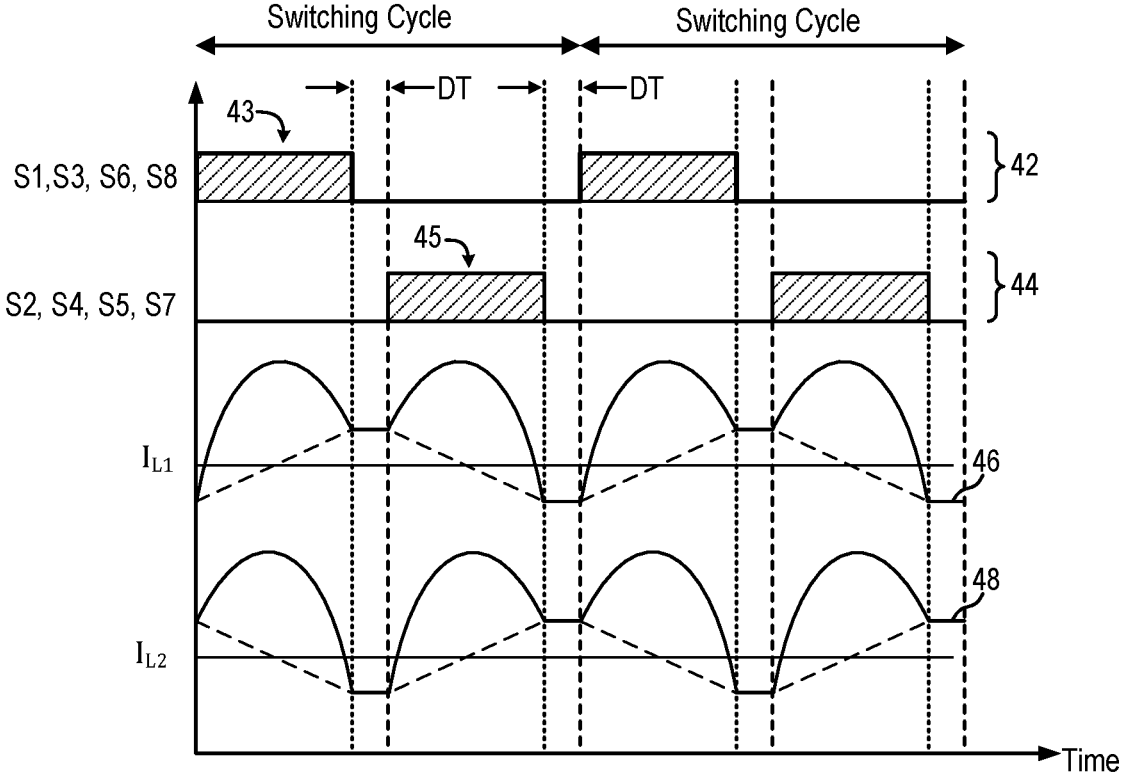
FIG. 2 includes signal waveforms illustrating the operation of the switching hybrid converter over switching cycles in some examples.

FIG. 2 includes signal waveforms illustrating the operation of the switching hybrid converter over switching cycles in some examples. In FIG. 2, two switching cycles during the operation of the hybrid converter of FIG. 1 are illustrated in some examples. Referring to FIG. 2, the first control signal is applied to the first group 42 of switches (S1, S3, S6 and S8). These switches therefore are turned on during a first duty cycle 43 and are turned off otherwise. Meanwhile, the second control signal is applied to the second group 44 of switches (S2, S4, S5 and S7). These switches therefore are turned on during a second duty cycle 45 and are turned off otherwise. In one example, the first and second duty cycles 43, 45 are each less than 50% of the switching cycle. In this manner, the first and second duty cycles 43, 45 are non-overlapping. That is, the first group 42 of switches are turned off for a dead time period DT before the second group 44 of switches are turned on. In the next switching cycle, the second group 44 of switches are turned off for a dead time period DT before the first group 42 of switches are turned on. In other words, during the dead time period DT between the first and second duty cycles, both groups of switches are turned off. In one embodiment, the first duty cycle 43 and the second duty cycle 45 have substantially equal duration within each switching cycle.

In operation, during the first duty cycle period when the first group 42 of switches are turned on, the current $I_{L1}$ in the inductor L1 swings up and increases with the magnetizing current while the current $I_{L2}$ in the inductor L2 also swings up but decreases with the magnetizing current. After the dead time period, during the second duty cycle period when the second group 44 of switches are turned on, the current $I_{L2}$ in the inductor L2 swings up and increases with the magnetizing current while the current ILI in the inductor L1 swings up but decreases with the magnetizing current. During the dead time between the two duty cycles where both groups of switches are turned off, the current flowing through the zero-voltage switching network of capacitor $C_{ZVS}$ and inductor $L_{ZVS}$ will charge/discharge the residue voltages and currents at switches S1, S2, S5 and S6.

Figure 3A:
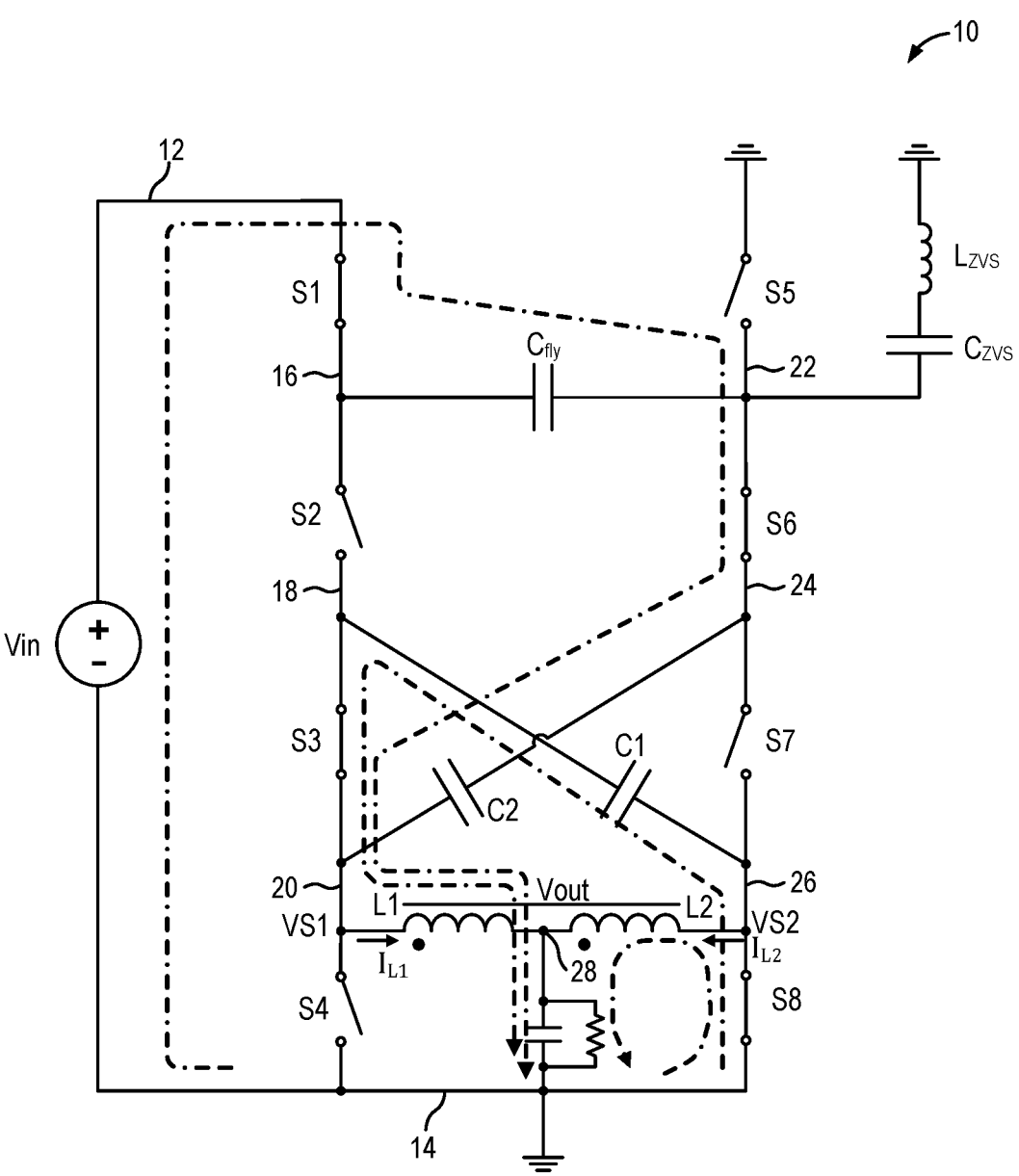
FIGS. 3(a) and 3(b) illustrate the operation of the switching hybrid converter in first and second switching states, respectively, in some examples.
Figure 3B:
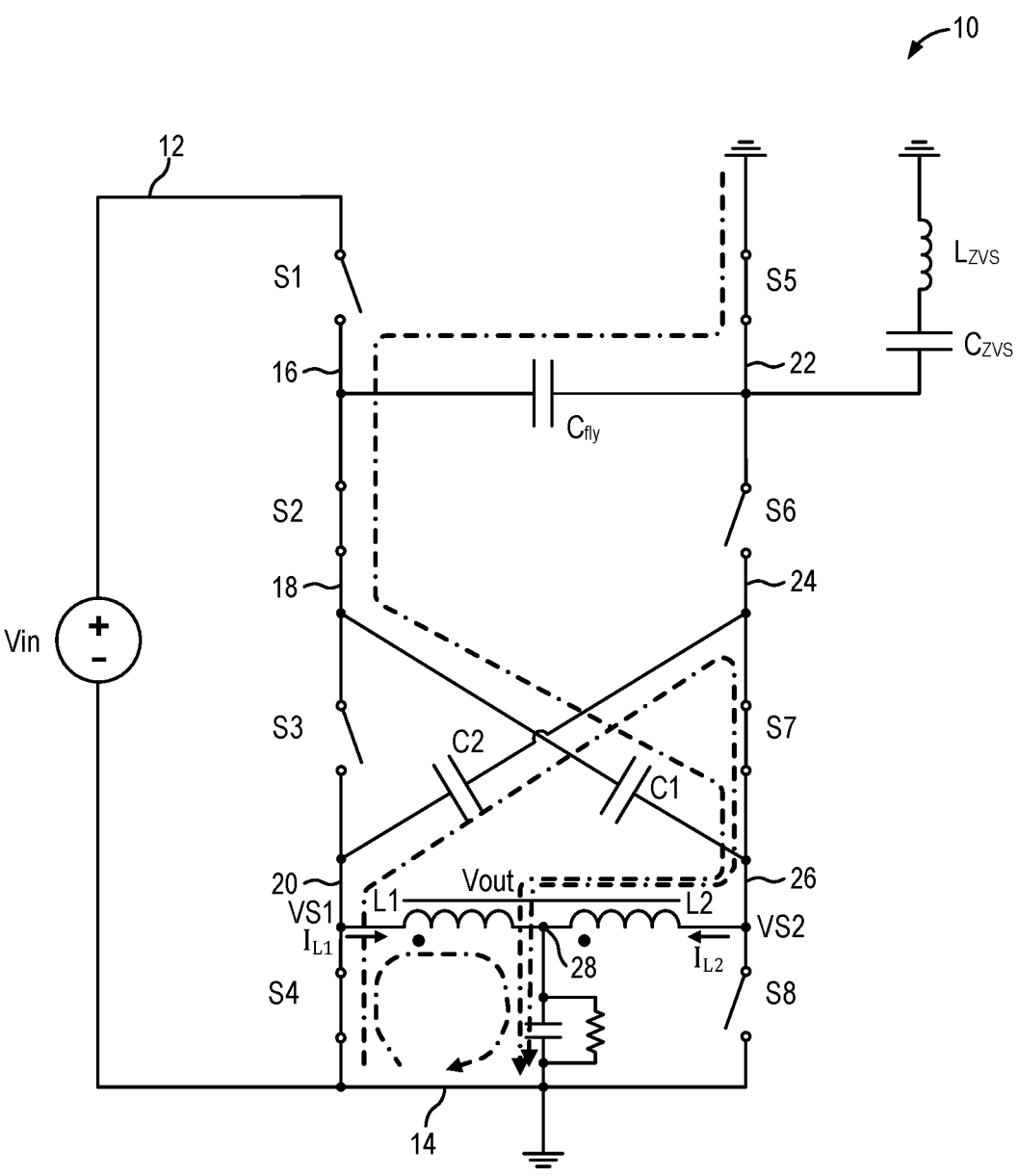

FIGS. 3(a) and 3(b) illustrate the operation of the switching hybrid converter in first and second switching states, respectively, in some examples. Referring first to FIG. 3(a), during the first switching state, switches S1, S3, S6 and S8 are closed while switches S2, S4, S5 and S7 are open. In that case, a current flows from the input voltage Vin (node 12) through the flying capacitor Cfly and capacitor C2 and inductor L1 to the output node 28. Meanwhile, another current flows from the ground potential (node 14) to capacitor C1 which is also directed to inductor L1 and onto the output node 28. The current through inductor L1 thus increases during the first switching state. Meanwhile, one terminal of the inductor L2 is connected to the ground potential through switch S8 which is closed. An induced current flows through inductor L2 and the output node 28 to deliver current to the load.

Referring first to FIG. 3(b), during the second switching state, switches S2, S4, S5 and S7 are closed while switches S1, S3, S6 and S8 are open. In that case, a current flows from the ground potential through the flying capacitor Cfly and capacitor C1 and inductor L2 to the output node 28. Meanwhile, another current flows from the ground potential (node 14) to capacitor C2 which is also directed to inductor L2 and onto the output node 28. The current through inductor L2 thus increases during the second switching state. Meanwhile, one terminal of the inductor L1 is connected to the ground potential through switch S4 which is closed. An induced current flows through inductor L2 and the output node 28 to deliver current to the load.

Figure 4:
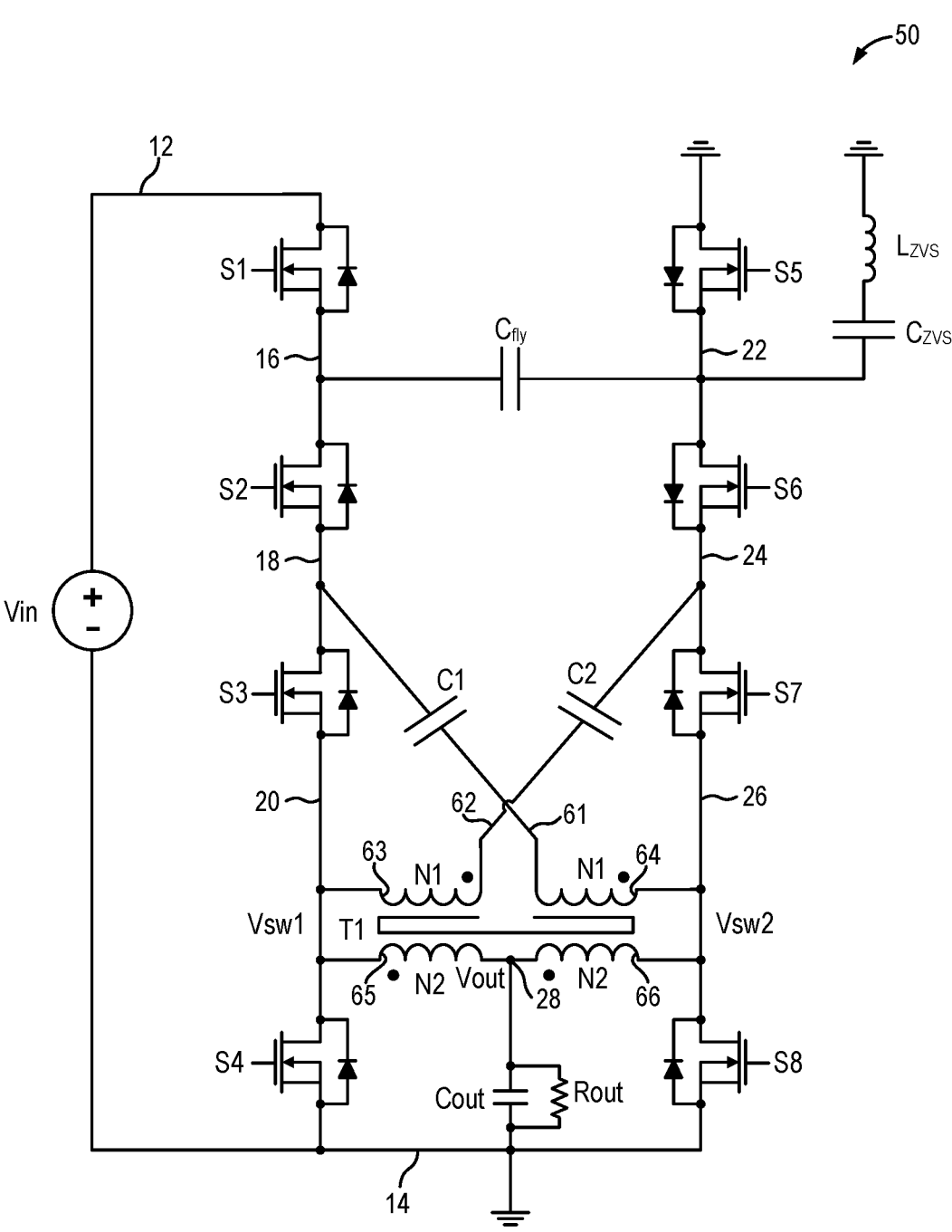
FIG. 4 is a schematic diagram of a non-isolated DC-to-DC switching hybrid converter in alternate embodiments of the present invention.

FIG. 4 is a schematic diagram of a non-isolated DC-to-DC switching hybrid converter in alternate embodiments of the present invention. Like elements in FIGS. 1 and 4 are given like reference numerals and detail description may be omitted to simplify the discussion. Referring to FIG. 4, a non-isolated DC-to-DC switching hybrid converter 50 is constructed in the same manner as the hybrid converter 10 of FIG. 1 except with a transformer replacing the coupled inductor. More specifically, the hybrid converter 50 includes a switched-capacitor circuit including switches S1 to S8 and three flying capacitors Cfly, C1 and C2. The hybrid converter 50 also includes a zero-voltage switching network of a capacitor $C_{ZVS}$ and an inductor $L_{ZVS}$. The switched-capacitor converter circuit in the hybrid converter 50 results in a fixed step-down ratio of M:1.

In embodiments of the present disclosure, hybrid converter 50 includes a transformer T1 coupled between nodes 20 and 26 and also coupled to the output node. The transformer T1 enables the converter to realize even larger step-down ratios. In the present embodiment, the transformer T1 includes a first primary winding 63 and a second primary winding 64, both inductively or magnetically coupled to a first secondary winding 65 and a second secondary winding 66. For example, the primary and secondary windings are wound on a common magnetic core.

In the present embodiment, the first primary winding 63 has one terminal connected to node 20 and another terminal connected to a node 62 which is coupled to one terminal of the capacitor C2. The second primary winding 64 has one terminal connected to node 26 and another terminal connected to a node 61 which is coupled to one terminal of the capacitor C1. Nodes 61 and 62 represent the center taps of the first and second primary windings of transformer T1. Furthermore, in the present embodiment, the first primary winding 63 of the transformer T1 is connected in series with the first secondary winding 65 at node 20 between switches S3 and S4. The second primary winding 64 of the transformer T1 is connected in series with the second secondary winding 66 at node 26 between switches S7 and S8. The first and second secondary windings 65 and 66 are connected in series with each other, between nodes 20 and 26. A center tap of the first and second secondary windings 65, 66 is the output node 28 providing the output voltage Vout. In the present embodiment, each primary winding and each secondary winding have a turns ratio of N1/N2. That is, the first primary winding 63 and the first secondary winding 65 have a turns ratio of N1/N2; and the second primary winding 64 and second secondary winding 66 have a turns ratio of N1/N2.

As thus configured, the hybrid converter 50 generates the output voltage Vout at the output node 28 having a stepped down value from the input voltage Vin determined by the fixed step-down ratio M:1 and the turns ratio N1/N2 of the transformer T1. Accordingly, the fixed step-down ratio of the hybrid converter 50 is increased by the turns ratio of N1/N2, where N1 is greater than N2. That is, the number of turns of the primary winding are greater than the number of turns of the secondary winding.

In one example, the step-down ratio of the hybrid converter 50 is given as:

$$\frac{V_{in}}{V_{out}} = M + \left(\frac{M}{2}\right) \times \frac{N_1}{N_2}.$$

In the case the fixed step-down ratio is 8:1, that is M=8, the step-down ratio of the hybrid converter 50 is given as:

$$\frac{V_{in}}{V_{out}} = 8 + 4 \times \frac{N_1}{N_2}.$$

The hybrid converter 50 can be operated in the same manner as described above with reference to hybrid converter 10, such as with the use of a PWM controller (not shown) to generate control signals to turn switches S1 to S8 alternately on and off to generate the output voltage Vout having the desired step-down ratio. In hybrid converter 50, the step-down ratio is increased by the turns ratio of the transformer T1.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps.

In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A DC-DC switching hybrid converter receiving an input voltage and generating an output voltage having a substantially constant magnitude on an output node, the hybrid converter comprising:

a switched-capacitor converter circuit comprising:
a plurality of switches configured to provide a fixed step-down ratio of M:1 between the input voltage and the output voltage;
a first capacitor coupled between a first node and a second node, the first node being switchably coupled to the input voltage and the second node being switchably coupled to a ground potential; and
second and third capacitors coupled to the plurality of switches in a cross-coupled configuration;
first and second inductors each having a first terminal coupled to the output node, the first and second inductors being configured as a coupled inductor; and
a zero-voltage switching network coupled between the second node and the ground potential to discharge voltages at some of the switches between switching states of the hybrid converter, wherein the zero-voltage switching network consists of a fourth capacitor and a third inductor connected in series between a first terminal and a second terminal, the first terminal being directly connected to the second node and the second terminal being directly connected to the ground potential,
wherein the hybrid converter generates the output voltage at the output node being 1/M of the input voltage.

2. The DC-DC switching hybrid converter of claim 1, wherein the plurality of switches of the switched-capacitor converter circuit comprise:

first, second, third and fourth switches connected in series between the input voltage and the ground potential, the first node being between the first switch and the second switch; and
fifth, sixth, seventh and eighth switches connected in series where the fifth switch and the eighth switch have respective end terminals connected to the ground potential, the second node being between the fifth switch and the sixth switch, wherein the second capacitor has a first terminal coupled to a third node between the second switch and the third switch and a second terminal coupled to a fourth node between the seventh switch and the eighth switch; and the third capacitor has a first terminal coupled to a fifth node between the sixth switch and the seventh switch and a second terminal coupled to a sixth node between the third switch and the fourth switch; and wherein the first inductor has the first terminal coupled to the output node and a second terminal coupled to the sixth node; and the second inductor has the first terminal coupled to the output node and a second terminal coupled to the fourth node.

3. The DC-DC switching hybrid converter of claim 2, wherein the hybrid converter is controlled by a clock signal having a first clock frequency, each period of the clock signal defining a switching cycle; and wherein the first, third, sixth and eighth switches are controlled by a first control signal and the second, fourth, fifth and seventh switches are controlled by a second control signal; within each switching cycle, the first control signal has a first duty cycle corresponding to a first switching state to turn on the first, third, sixth and eighth switches and the second control signal has a second duty cycle corresponding to a second switching state to turn on the second, fourth, fifth and seventh switches, the first duty cycle being non-overlapping with the second duty cycle.

4. The DC-DC switching hybrid converter of claim 3, wherein the first and second duty cycle have substantially equal duration within each switching cycle.

5. The DC-DC switching hybrid converter of claim 3, wherein the zero-voltage switching network discharges the first, second, fifth and sixth switches during a time period between the first and second switching states of the hybrid converter to realize zero voltage switching across the switches.

6. The DC-DC switching hybrid converter of claim 3, wherein the first and second inductors have the same voltage values during the first switching state and have the same voltage values during the second switching state.

7. The DC-DC switching hybrid converter of claim 3, wherein the first to eighth switches each comprises an N-type metal-oxide-silicon field effect transistor (MOS-FET), the first control signal being coupled to gate terminals of the N-type MOSFETs forming the first, third, sixth and eighth switches to turn the N-type MOSFETs on and off, and the second control signal being coupled to gate terminals of the N-type MOSFETs forming the second, fourth, fifth and seventh switches to turn the N-type MOSFETs on and off.

8. The DC-DC switching hybrid converter of claim 7, wherein during the first duty cycle, the first inductor has an increasing inductor current and the second inductor has a decreasing inductor current, and during the second duty cycle, the first inductor has a decreasing inductor current and the second inductor has an increasing inductor current.

9. The DC-DC switching hybrid converter of claim 1, wherein the second and third capacitors have the same capacitance values and the first and second inductors have the same inductance values.

10. The DC-DC switching hybrid converter of claim 1, wherein the hybrid converter has a fixed step-down ratio of 8:1.

11. A DC-DC switching hybrid converter receiving an input voltage and generating an output voltage having a substantially constant magnitude on an output node, the hybrid converter comprising:

a switched-capacitor converter circuit comprising:
a plurality of switches configured to provide a fixed step-down ratio of M:1 between the input voltage and the output voltage;
a first capacitor coupled between a first node and a second node, the first node being switchably coupled to the input voltage and the second node being switchably coupled to a ground potential; and
second and third capacitors coupled to the plurality of switches in a cross-coupled configuration;
a transformer including a first primary winding and a second primary winding inductively coupled to a first secondary winding and a second secondary winding, center taps of the first and second primary windings being coupled to respective second and third capacitors, each primary winding and each secondary winding have a turns ratio of N1/N2; and
a zero-voltage switching network coupled between the second node and the ground potential to discharge voltages at some of the switches between switching states of the hybrid converter, wherein the zero-voltage switching network consists of a fourth capacitor and a third inductor connected in series between a first terminal and a second terminal, the first terminal being directly connected to the second node and the second terminal being directly connected to the ground potential,
wherein the hybrid converter generates the output voltage at the output node having a stepped down value from the input voltage determined by the fixed step-down ratio M:1 and the turns ratio N1/N2 of the transformer.

12. The DC-DC switching hybrid converter of claim 11, wherein the plurality of switches of the switched-capacitor converter circuit comprise:

first, second, third and fourth switches connected in series between the input voltage and the ground potential, the first node being between the first switch and the second switch; and fifth, sixth, seventh and eighth switches connected in series where the fifth switch and the eighth switch have respective end terminals connected to the ground potential, the second node being between the fifth switch and the sixth switch, wherein the second capacitor has a first terminal coupled to a third node between the second switch and the third switch and a second terminal coupled to a second center tap of the second primary winding of the transformer; and the third capacitor has a first terminal coupled to a fifth node between the sixth switch and the seventh switch and a second terminal coupled to a first center tap of the first primary winding; and wherein the first primary winding of the transformer is connected in series with the first secondary winding at a sixth node between the third switch and the fourth switch; the second primary winding of the transformer is connected in series with the second secondary winding at a forth node between the seventh switch and the eighth switch, the first and second secondary windings being connected in series between the sixth and the fourth nodes, a center tap of the first and second secondary windings is the output node providing the output voltage.

13. The DC-DC switching hybrid converter of claim 12, wherein the hybrid converter is controlled by a clock signal having a first clock frequency, each period of the clock signal defining a switching cycle; and wherein the first, third, sixth and eighth switches are controlled by a first control signal and the second, fourth, fifth and seventh switches are controlled by a second control signal; within each switching cycle, the first control signal has a first duty cycle corresponding to a first switching state to turn on the first, third, sixth and eighth switches and the second control signal has a second duty cycle corresponding to a second switching state to turn on the second, fourth, fifth and seventh switches, the first duty cycle being non-overlapping with the second duty cycle.

14. The DC-DC switching hybrid converter of claim 13, wherein the zero-voltage switching network discharges the first, second, fifth and sixth switches during a time period between the first and second switching states of the hybrid converter to realize zero voltage switching across the switches.

15. The DC-DC switching hybrid converter of claim 13, wherein the first to eighth switches each comprises an N-type metal-oxide-silicon field effect transistor (MOSFET), the first control signal being coupled to gate terminals of the N-type MOSFETs forming the first, third, sixth and eighth switches to turn the N-type MOSFETs on and off, and the second control signal being coupled to gate terminals of the N-type MOSFETs forming the second, fourth, fifth and seventh switches to turn the N-type MOSFETs on and off.

16. The DC-DC switching hybrid converter of claim 15, wherein during the first duty cycle, the first inductor has an increasing inductor current and the second inductor has a decreasing inductor current, and during the second duty cycle, the first inductor has a decreasing inductor current and the second inductor has an increasing inductor current.

17. The DC-DC switching hybrid converter of claim 11, wherein the hybrid converter generates the output voltage at the output node having a stepped down value being M+(M/2)*N1/N2.

18. The DC-DC switching hybrid converter of claim 13, wherein the first and second duty cycle have substantially equal duration within each switching cycle.

\* \* \* \* \*